United States Patent [19]

Konishi et al.

[11] 3,846,331

[45] Nov. 5, 1974

[54] SOLVENT COMPOSITION FOR DYES FOR USE IN PRESSURE-SENSITIVE COPYING PAPER

[75] Inventors: Akio Konishi; Masaaki Takahashi; Fumihiko Kimura; Takehisa Toguchi, all of Tokyo, Japan

[73] Assignee: Kureha Kagaku Kogyo Kabushiki Kaisha, Tokyo, Japan

[22] Filed: Aug. 4, 1972

[21] Appl. No.: 277,864

[30] Foreign Application Priority Data
Aug. 4, 1971    Japan................................ 46-58363

[52] U.S. Cl............................ 252/364, 8/94, 8/174, 106/311, 117/36.2, 252/316, 252/363.5
[51] Int. Cl.............................................. B01f 1/00
[58] Field of Search ....... 252/364, 363.5; 8/94, 174; 106/311

[56] References Cited

UNITED STATES PATENTS

| | | | |
|---|---|---|---|
| 1,803,008 | 4/1931 | Ellis et al............................. | 8/94 X |
| 2,800,457 | 7/1957 | Green et al......................... | 252/316 |
| 3,627,581 | 12/1971 | Phillips, Jr........................... | 252/316 X |

FOREIGN PATENTS OR APPLICATIONS

| | | | |
|---|---|---|---|
| 915,342 | 1/1963 | Great Britain.......................... | 8/94 |

*Primary Examiner*—Richard D. Lovering

[57] ABSTRACT

A dye solvent composition for use in pressure-sensitive copying paper containing one or more aromatic hydrocarbons and a compound selected from a group that includes naphthyl phenyl methane, naphthyl phenyl ethane, and derivatives thereof.

7 Claims, No Drawings

SOLVENT COMPOSITION FOR DYES FOR USE IN PRESSURE-SENSITIVE COPYING PAPER

BACKGROUND OF THE INVENTION

This invention relates to a solvent composition for dyes for use in the production of pressure-sensitive paper, and more particularly to a dye solvent composition suitable for use in the preparation of microcapsulated dyes which are applied to the top or master sheet of a copy paper set. The dye and solvent composition has an affinity for a color developer present in the underlying sheets. Copy paper sets of this type are within that class of copy paper generally termed "carbonless."

Chlorinated biphenyls (hereinafter referred to as PCB) have previously been used as solvents for the preparation of micro-capsulated dyes. However, the use of PCB poses a threat to the environment because PCB is not considered biodegradable. PCB could conceivably accumulate in various kinds of animals and plants in the same manner as do chlorine base agricultural chemicals such as DDT, BHC, and the like, and could eventually do harm to human beings. Furthermore, PCB has a disadvantage in that if copying paper coated with microcapsules containing PCB were discarded and burnt, the PCB would produce hydrogen chloride gas which gas causes corrosive damage to burning apparatus and carries an offensive odor.

Therefore, there exists a need in the art to provide a solvent which may be used in lieu of PCB for the preparation of dye microcapsules.

In recent years, aromatic hydrocarbon solvents, i.e. diaryl methanes, alkyl naphthalenes, triaryl dimethanes and alkyl diphenyls have been developed to take the place of the PCB, with the result that the above-mentioned environmental problems associated with the use of the PCB have been at least partially overcome. However, such hydrocarbon solvents result in poorly colored copies when used in combination with certain newly developed acidic resin developers. The new acidic resin developers used for copy paper include acidic resins such as phenolic resin and the like as well as inorganic solid acidic materials (for example acidic activated clay). These acidic resin developers will probably find more extensive use in copying paper in the future due to the fact that they adsorb less moisture and contaminants from the air than the above-mentioned inorganic solid acidic materials, and can be more easily applied to paper sheets. The above-mentioned aromatic hydrocarbon solvents per se have low affinity for such acidic resin developers and therefore copy paper sets using these in combination do not produce good copies. Accordingly, there exists a need in the art for a means for enhancing the affinity of such hydrocarbon solvents for the new acidic resin developers.

SUMMARY OF THE INVENTION

It has now been discovered that by using a solvent composition for the pressure-sensitive copying paper containing 100 parts of one or more aromatic hydrocarbons selected from the group consisting of diaryl methanes, alkyl naphthalenes, triaryl dimethanes and alkyl diphenyls, and 10-100 parts of a compound having the general formula:

I. 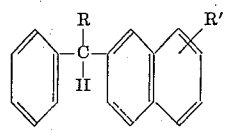

wherein R and R' represent hydrogen or a methyl group, the dye solubility in the solvent will be greatly improved and the affinity of the solvent for acidic resin developers as well as the conventional inorganic solid acidic developers will be significantly increased with the result that the coloration of the copy print is remarkably improved.

DESCRIPTION OF THE PREFERRED EMBODIMENTS

The compounds (hereinafer referred to as dye solubility improving agents) respresented by formula I improve the solubility of the dye used for the pressure-sensitive copying paper. They include naphthyl phenyl methane, naphthyl phenyl ethane, methyl naphthyl phenyl methane and methyl naphthyl phenyl ethane. These compounds have a number of isomers which are different from each other only in the positions of the substituted groups. Any one of these compounds is suitable for use in the compositions of the present invention, either alone, as a pure compound or as a mixture of two or more isomers. Mixtures of two or more of the above-named dye solubility improving agents are also suitable for use in the compositions of the present invention. These agents may be in the form of liquid or solid at room temperature.

The dye solubility improving agents represented by formula I may be readily prepared by condensing naphthalene and/or methyl naphthalene and benzyl chloride in the presence of a catalyst of ferric chloride. The naphthyl phenyl ethanes can also be easily prepared by condensing naphthalene and/or methyl naphthalene and styrene in the presence of sulfuric acid or like catalyst.

In formulating the compositions of the present invention the amount of dye solubility improving agent added is generally in the range of 10–100 parts, and preferably 30–70 parts per 100 parts of the aromatic solvent, though these amounts will vary in accordance with the particular solvent used. Where the dye solubility improving agent is added to the solvent in an amount less than 10 parts per 100 parts solvent, the improvement in the dye solubility is not recognizable. Where more than 100 parts are added, the viscosity of the dye solution becomes high, resulting in difficulty in microcapsulation of the dye. Also, it is disadvantageous from the viewpoint of economics to use the dye solubility improving agent in excessive amounts.

The aromatic hydrocarbon solvent for the dye used in the present invention is selected from the group consisting of diaryl methanes, alkyl naphthalenes, triaryl dimethanes and alkyl diphenyls and mixtures of these compounds. Suitable solvents also include mixtures of one or more of these compounds with one or more other compatible solvents. The preferred solvents include:

diaryl methanes having the following formula:

II. 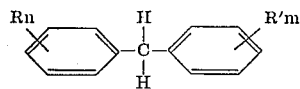

(wherein R and R' are hydrogen or an alkyl group having 1-4 carbon atoms, respectively, and m and n are an integer of from 1 to 3, the total number of carbon atoms of R and R' being 2-6, respectively);

alkyl naphthalenes having the following general formula:

III. 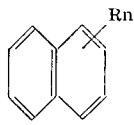

(wherein R is an alkyl group having 1 to 6 carbon atoms, n is an integer of from 1 to 4, and R may be the same or different when n is 2-4, the total number of carbon atoms in R being 4-6);

triaryl dimethanes represented by the following general formula:

IV. 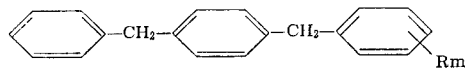

(wherein R is an alkyl group having carbon atoms of from 1 to 4 and m is an integer of from 1 to 4); and alkyl diphenyls having the following general formula:

V. 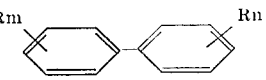

(wherein R is an alkyl group having carbon atoms of from 1 to 6, m and n are an integer of from 0 to 4, respectively, and Rm and Rn may be the same or different, the total number of the carbon atoms in R being 2-6).

By way of example, typical compounds within the above-described groups include: cumyl phenyl methane, xylyl phenyl methane, dipropyl naphthalene, methyl propyl naphthalene, monomethyl triphenyl dimethane, isopropyl diphenyl and the like.

The solvent compositions of the present invention are excellent for dissolving a dye for use with pressure-sensitive copying papers and give preferred coloring effects to the dye when applied to a paper sheet.

The solvent compositions of the present invention can be used in combination with leuco type dyes generally used in the production of the pressure-sensitive copying paper, such as Methyl Violet, Crystal Violet, Malachite Green, Rhodamine B and the like, and for other dyes such as o-hydroxybenzalacetophenone, michlershydrol derivatives, fluorane derivatives, and indole pyromellitate derivatives. The solvent compositions may also be used in combination with oil-soluble dyes such as Azo BlueBlack, Nigrosine, Oil Black, Sudan IV, Sudan III and the like. These dyes may be used within the range of 0.5 to 15 percent by weight, and preferably 1-8 percent. Optionally, mineral oil may be added to the solvent compositions of the present invention for the purpose of reducing the production cost of the pressure-sensitive copying paper and of adjusting the viscosity of the dye solution. Suitable mineral oils include petroleum products such as kerosenes, light oils, insulating oils, and lubricating oils. The amount of mineral oil used is usually less than 100 parts by volume per 100 parts of the solvent composition, and preferably within a range of 20-80 parts by volume. Within the preferred range, the composition of the present invention properly acts as a solvent and the range represents economical amounts for most practical applications.

In the preparation of pressure-sensitive copying paper, using the above-described solvent composition and dye, processes described, for example, in U.S. Pat. Nos. 2,548,366, 2,800,457 and 2,800,458 may be employed. One example of a process employing the solvent composition of the present invention includes the steps of dissolving a dye in the solvent composition, emulsifying the resultant solution in a mixed aqueous solution of gelatin and gum arabic and then encapsulating the emulsified oily droplets to form colloids by a coacervation method. The pressure-sensitive copying paper can be prepared by applying the emulsion containing fine oily droplets of the dye solution onto a paper sheet.

Examples of the developers which attain color development of the dye in the microcapsules are inorganic acidic materials such as bentonite, zinc oxide, kaolin, clay, activated clay, acid clay, zeolite, talc, colloidal silica and the like and acidic polymers such as phenolaldehyde resins, maleic acid-rosin resins, hydrolyzed products of styrene-maleic anhydride copolymers, hydrolyzed products of ethylene-maleic anhydride copolymers, carboxypolyethylene, hydrolyzed products of vinyl methyl ether-maleic anhydride copolymers. The underlying or second sheets for the pressure-sensitive copying paper sets can easily be prepared by coating a paper sheet with any of these developers.

The solvent composition of the present invention is low in toxity as compared to the conventional PCB solvent and remarkably improves the dye solubility as well as the coloring effect of the dye and light resistance. A particular advantage is the greatly improved coloring effect of the dye when used in combination with an acidic resin developer.

Pressure-sensitive copying paper containing the solvent composition of the present invention can be discarded and burnt without danger of environmental pollution caused by generation of hydrogen chloride.

The following examples are intended to be illustrative only, and are not intended to limit the scope of the present invention as defined by the appended claims.

EXAMPLE 1

Table 1 below shows general properties of the dye solubility improving agents of the compositions of the present invention.

Table 1

| | Boiling point °C | Melting point °C | Specific gravity $d_1^{15}$ | Refractive Index $n_D^{25}$ | Viscosity (25°C) cst |
|---|---|---|---|---|---|
| Naphthyl phenyl methane | 340–350 | 49–51 | — | — | — |
| Naphthyl phenyl ethane | 360 | 62 | — | — | — |
| Naphthyl methyl phenyl ethane | 350–360 | — | 1.078 | 1.638 | 57 |
| Naphthyl methyl phenyl ethane | 370 | — | 1.065 | 1.632 | 59 |

Dipropyl naphthalene (melting point of 297°–300°C, refractive index $n_D^{20}$ of 1.565, specific gravity $d_4^{15}$ of 0.956) was used as a solvent and Crystal Violet Lactone was employed as a dye for determining the dye solubility of the solvent per se and also for determining the amount of the improving agent of the present invention to be added to the solvent for dissolving the dye in the solvent composition in a ratio of 10g : 100 ml. The test results are shown in Table 2 below. It is apparent from Table 2 that the dye solubility is greatly improved by the present invention.

Table 2

|  | Dye Solubility | Parts of improving agents for obtaining dye solubility of 10g/100ml (per 100 parts by weight of oil) |
| --- | --- | --- |
| Dipropyl naphthalene | 5.0 | — |
| Naphthyl phenyl methane | — | 43 |
| Methyl naphthyl phenyl methane | — | 50 |
| Naphthyl phenyl ethane | — | 52 |
| Methyl naphthyl phenyl ethane | — | 64 |

EXAMPLE 2

In order to study the effect on dye solubility, naphthyl phenyl methane was added in varied amounts to 100 parts each of dipropyl naphthalene and xylyl phenyl methane (specific gravity of 0.987, refractive index $n_D^{25}$ of 1.569, viscosity cst/25°C of 4.5) as shown in Table 3. The solubility of Crystal Violet Lactone (CVL) per 100 ml of each of the various solvent compositions was determined. As is apparent from the test results shown in Table 3, the dye solubility is significantly increased by the addition of the improving agent to the solvent.

Table 3

| Additive | Parts (by wt) | Solvent | Parts (by wt) | Dye solubility g/100 ml |
| --- | --- | --- | --- | --- |
| Naphthyl phenyl methane | 0 | Dipropyl naphthalene | 100 | 5.0 |
| do. | 10 | do. | do. | 6.2 |
| do. | 30 | do. | do. | 8.5 |
| do. | 50 | do. | do. | 11.0 |
| do. | 70 | do. | do. | 13.0 |
| do. | 100 | do. | do. | 16.0 |
| do. | 0 | Xylyl phenyl methane | 100 | 4.0 |
| do. | 10 | do. | do. | 5.0 |
| do. | 30 | do. | do. | 7.2 |
| do. | 50 | do. | do. | 9.3 |
| do. | 70 | do. | do. | 11.4 |
| do. | 100 | do. | do. | 14.0 |

The effects of naphthyl phenyl methane on other solvents are shown in Table 4 below.

Table 4

| Solvent | Dye Solubility g/100 ml | Parts of improving agent for obtaining CVL 10g/100 ml (per 100 parts by weight of solvent) |
| --- | --- | --- |
| Methyl propyl naphthalene | 6.5 | 26 |
| Cumyl phenyl methane | 3.5 | 66 |
| Isopropyl diphenyl | 5.5 | 37 |
| Triaryl dimethane | 7.0 | 22 |
| Conventional solvent PCB/Mineral oil (6:4) | 3.0 | 75 |

EXAMPLE 3

This example describes the preparation of microcapsules of the dye containing solvent composition of the present invention and the production of pressure-sensitive copying paper coated with the microcapsules. To an aqueous solution formed by dissolving 36 g of gum arabic in 108 g of water was added a coloring dye containing solution which was obtained by dissolving 4.7 g of Crystal Violet Lactone and 2.9 g of Leuco Methylene Blue in a mixed solvent of 42 g of each of the improving agents in Table 1 and 84 g of dipropyl naphthalene. The resultant solution was agitated to form an emulsion. To the agitated emulsion was added a sol which was prepared by dissolving 36 g of gelatine in 180 g of water and which had an isoelectric point of pH 8. Sodium hydroxide was then added to the mixture to raise the pH to 9 and thereafter 900 g of warm water was added. Then acetic acid was added to the system to drop the pH to 4.3, thus inducing coacervation. The gelatine and gum arabic formed a dense liquid film around the dye containing oily droplets. 6.8 g of 37 percent formalin aqueous solution was added and the temperature of the system was lowered to cause the liquid film to gel. Finally, sodium hydroxide was added to the system to raise the pH thereof to 9.5 and the system was maintained in that state, allowing the dense liquid film to completely harden to form microcapsules. The microcapsules thus obtained were applied into one side of a paper sheet with use of a meyer bar to give a coating weight of 5 g/m². The microcapsule coated sheet was dried to form the top or master sheet of a pressure-sensitive copying paper set. The underlying sheets were prepared by coating them with an acidic active clay and a phenol-formalin resin, respectively. For comparative purposes, top or master sheets using PCB as a dye solvent were prepared in the same manner as described above. The pressure-sensitive copying paper sets thus prepared were subjected to coloring tests by handwriting and typing. The results of these tests are shown in Table 5 below.

Table 5

|  | Dye Solubility improving agent added to Dipropyl naphthalene | Odor | Coloring | | Light resistance | |
| --- | --- | --- | --- | --- | --- | --- |
|  |  |  | Acidic active clay | Synthetic resin | Acidic active clay | Synthetic resin |
| Present invention | Naphthyl phenyl methane | A | A | A | A | A |
|  | Naphthyl phenyl ethane | A | A | A | A | A |
|  | Methyl naphthyl phenyl methane | A | A | A | A | A |
|  | Methyl naphthyl ethane | A | A | A | A | A |
| Conventional products | PCB | C | A | A | A | A |

A: Excellent   C: Poor

The light resistance was measured by radiating the top sheet with a Xenone meter for 10 hours and then coloring the same on each underlying sheet. In the results shown, A indicated excellent coloration while C indicates poor coloration.

We claim:

1. A dye solvent composition for use in pressure-sensitive copying paper comprising:
   100 parts by weight of an aromatic hydrocarbon dye solvent selected from the group consisting of diaryl methanes, alkyl naphthalenes, triaryl dimethanes, alkyl diphenyls, and mixtures thereof, and;
   10–100 parts by weight of one or more of a compound having the general formula:

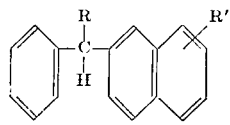

wherein R and R' represent hydrogen or a methyl group.

2. The dye solvent composition of claim 1 wherein said compound is selected from the group consisting of naphthyl phenyl methane, naphthyl phenyl ethane, methyl naphthyl phenyl methane and methyl naphthyl phenyl ethane.

3. The dye solvent composition of claim 1 wherein diaryl methanes are compounds having a general formula:

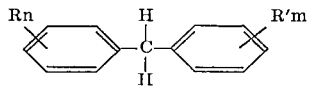

wherein R and R' represent hydrogen or an alkyl group having 1–4 carbon atoms and m and n are an integer of from 1 to 3, the total number of carbon atoms of R and R' being 2–6.

4. The dye solvent composition of claim 1 wherein said alkyl naphthalenes are compounds having the general formula:

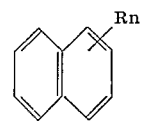

wherein R represents an alkyl group having 1 to 6 carbon atoms, n is an integer of from 1 to 4 and where n is 2–4, R may be the same or different but the total number of carbon atoms of R must be 4–6.

5. The dye solvent composition of claim 1 wherein said triaryl dimethanes are compounds having the general formula:

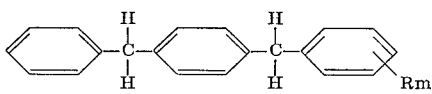

wherein R represents an alkyl group having 1 to 4 carbon atoms and m is an integer of from 1 to 4.

6. The dye solvent composition of claim 1 wherein said alkyl diphenyls are compounds having the general formula:

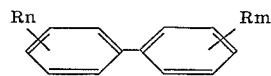

wherein R is an alkyl group having 1 to 6 carbon atoms, m and n are an integer of from 0 to 4, and Rn and Rm may be the same or different, the total number of carbon atoms of R being 2–6.

7. The dye solvent composition of claim 1, further comprising 20–80 parts by weight of mineral oil per 100 parts by weight of said dye solvent.

* * * * *